(12) United States Patent
Pascarella et al.

(10) Patent No.: US 9,840,662 B2
(45) Date of Patent: Dec. 12, 2017

(54) HYDROFLUORIC ACID ACIDIZING COMPOSITION COMPATIBLE WITH SENSITIVE METALLURGICAL GRADES

(71) Applicant: Halliburton Energy Services, Inc., Houston, TX (US)

(72) Inventors: Natalie Lynn Pascarella, Houston, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/036,046

(22) PCT Filed: Dec. 11, 2013

(86) PCT No.: PCT/US2013/074440
§ 371 (c)(1),
(2) Date: May 11, 2016

(87) PCT Pub. No.: WO2015/088519
PCT Pub. Date: Jun. 18, 2015

(65) Prior Publication Data
US 2016/0340572 A1    Nov. 24, 2016

(51) Int. Cl.
| | |
|---|---|
| *E21B 43/22* | (2006.01) |
| *C09K 8/74* | (2006.01) |
| *E21B 43/28* | (2006.01) |
| *C09K 8/54* | (2006.01) |
| *E21B 17/01* | (2006.01) |
| *E21B 43/25* | (2006.01) |

(52) U.S. Cl.
CPC .................. *C09K 8/74* (2013.01); *C09K 8/54* (2013.01); *E21B 17/01* (2013.01); *E21B 43/25* (2013.01); *E21B 43/28* (2013.01); *C09K 2208/32* (2013.01)

(58) Field of Classification Search
CPC ........ C09K 8/74; C09K 8/54; C09K 2208/32; C09K 8/86; C09K 8/72; E21B 43/25; E21B 43/28; E21B 33/13; E21B 43/114; E21B 41/02
See application file for complete search history.

(56) References Cited

U.S. PATENT DOCUMENTS

| | | | |
|---|---|---|---|
| 3,222,289 A | 12/1965 | Clark et al. | |
| 6,001,186 A | 12/1999 | Johnson et al. | |
| 7,855,168 B2 | 12/2010 | Fuller et al. | |
| 2004/0254079 A1* | 12/2004 | Frenier .................... | C09K 8/52 |
| | | | 507/260 |
| 2006/0219661 A1 | 10/2006 | Towse et al. | |
| 2007/0281868 A1 | 12/2007 | Pauls et al. | |
| 2008/0280046 A1 | 11/2008 | Bryden et al. | |
| 2009/0042748 A1 | 2/2009 | Fuller | |
| 2009/0156433 A1 | 6/2009 | Mebratu et al. | |
| 2010/0276152 A1 | 11/2010 | De Wolf et al. | |
| 2011/0286802 A1 | 11/2011 | Persson et al. | |
| 2012/0067576 A1 | 3/2012 | Reyes et al. | |
| 2012/0097392 A1 | 4/2012 | Reyes et al. | |
| 2012/0199357 A1* | 8/2012 | Seth ....................... | E21B 41/02 |
| | | | 166/310 |
| 2013/0269936 A1 | 10/2013 | Reyes et al. | |
| 2013/0269946 A1 | 10/2013 | Dziekonski | |
| 2013/0269947 A1 | 10/2013 | Shilling et al. | |
| 2013/0274155 A1 | 10/2013 | Nasr-el-din et al. | |
| 2015/0179510 A1* | 6/2015 | Thompson ........ | H01L 21/76897 |
| | | | 438/643 |

FOREIGN PATENT DOCUMENTS

| | | | |
|---|---|---|---|
| CN | 104073802 A | * 10/2014 | |
| FR | 2527642 A1 | * 12/1983 | ............... C23F 1/26 |
| WO | 2015/088519 A2 | 6/2015 | |
| WO | 2015/088587 A1 | 6/2015 | |

OTHER PUBLICATIONS

International Preliminary Report on Patentability issued in related Application No. PCT/US2013/074440, dated Jun. 23, 2016 (10 pages).

Kalfayan, Leonard John. "Fracture acidizing: History, present state, and future." SPE Paper 106371, SPE Hydraulic Fracturing Technology Conference. Society of Petroleum Engineers, 2007.

Mainier, Fernando B., et al. "Evaluation of titanium in hydrochloric acid solutions containing corrosion inhibitors." IOSR Journal of Mechanical and Civil Engineering 10.1 (2013): 66-69.

Baxter, Carl F., Ronald W. Schutz, and Christopher S. Caldwell. "Experience and Guidance in the Use of Titanium Components in Steel Catenary Riser Systems." Offshore Technology Conference. Offshore Technology Conference, 2007. OTC-18624-MS.

International Search Report and Written Opinion issued in related PCT Application No. PCT/US2014/046848 dated Nov. 14, 2014, 13 pages.

International Search Report and Written Opinion issued in related PCT Application No. PCT/US2013/074440 dated Jul. 28, 2014, 13 pages.

Restrepo, Alejandro, et al. "Effective Kaolinite Damage Control Under Unfavorable Chemical Environment: Field Case." SPE Paper 151841, SPE International Symposium and Exhibition on Formation Damage Control. Society of Petroleum Engineers, 2012.

Jaramillo, Oscar Julian, et al. "Matrix Acid Systems for Formations With High Clay Content." SPE Paper 126719, SPE International Symposium and Exhibiton on Formation Damage Control. Society of Petroleum Engineers, 2010.

(Continued)

*Primary Examiner* — Zakiya W Bates
(74) *Attorney, Agent, or Firm* — Craig W. Roddy; Baker Botts L.L.P.

(57) ABSTRACT

Systems and methods for hydrofluoric (HF) acidizing compositions compatible with sensitive metallurgic grades. The systems and methods may include preparing an aqueous acidizing composition comprising one or more acid components, hydrofluoric acid, and one or more corrosion inhibitors; and injecting the aqueous composition into a subterranean formation containing sensitive metallurgic components via a wellbore.

18 Claims, 6 Drawing Sheets

(56) References Cited

OTHER PUBLICATIONS

Rozo, Rafael Eduardo, et al. "An alternative solution to sandstone acidizing using a nonacid based fluid system with fines-migration control." SPE Paper 109911, SPE Annual Technical Conference and Exhibition. Society of Petroleum Engineers, 2007.
Tuedor, Francis E., et al. "A breakthrough fluid technology in stimulation of sandstone reservoirs." SPE Paper 98314, SPE International Symposium and Exhibition on Formation Damage Control. Society of Petroleum Engineers, 2006.
"Corrosion Resistant Alloys for Deep Offshore Drilling by High Density Infrared Fusion Process" found at pennwell. websds.net/2013/dot/papers/T1S402-paper.pdf, 2013.
Virtanen, S. (2012). Degradation of Titanium and Its Alloys. In Degradation of Implant Materials (pp. 29-55). Springer New York.

* cited by examiner

US 9,840,662 B2

HYDROFLUORIC ACID ACIDIZING COMPOSITION COMPATIBLE WITH SENSITIVE METALLURGICAL GRADES

CROSS-REFERENCE TO RELATED APPLICATION

The present application is a U.S. National Stage Application of International Application No. PCT/US2013/074440 filed Dec. 11, 2013, which is incorporated herein by reference in its entirety for all purposes.

FIELD

The present disclosure relates to systems and methods for hydrofluoric acid (HF) acidizing compositions, and, more specifically, to systems and methods for treatment fluids for sensitive metallurgical grades.

BACKGROUND

Treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

In acidizing operations, a subterranean formation containing an acid-soluble material can be treated with an acid to dissolve at least a portion of the material. Formation components of the formation matrix may comprise the acid-soluble material in some cases. In other cases, the acid-soluble material may have been deliberately introduced into the subterranean formation in conjunction with a stimulation operation (e.g., proppant particulates). Illustrative examples of formation components that may be dissolved by an acid include, for example, carbonates, silicates, and aluminosilicates. Dissolution of these formation components can desirably open voids and conductive flow pathways in the formation that can improve the formation's rate of hydrocarbon production, for example. In a similar motif, acidization may be used to remove like types of precipitation damage that can be present in the formation.

Carbonate formations often contain minerals that comprise a carbonate anion (e.g., calcite). When acidizing a carbonate formation, the acidity of the treatment fluid alone can be sufficient to solubilize the formation components. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars. Most sandstone formations contain about 40% to about 98% sand quartz particles (i.e., silica), bonded together by various amounts of cementing material including carbonates (e.g., calcite), aluminosilicates, and other silicates. As used herein, the term "siliceous" refers to a substance having the characteristics of silica, including silicates and/or aluminosilicates.

Acidizing a siliceous formation (e.g., a sandstone formation or a clay-containing formation) presents substantial difficulties and differences than when acidizing a carbonate formation. Specifically, the treatment of a siliceous formation with the treatment fluids commonly used for acidizing a carbonate formation may have little to no effect, because mineral acids and organic acids do not effectively react with siliceous materials. In contrast to mineral acids and organic acids, hydrofluoric acid can react very readily with siliceous materials to produce soluble substances.

The use of hydrofluoric acid (HF), however, can be detrimental to certain types of equipment. In particular, HF is especially corrosive to sensitive metallurgic grades, such as titanium. As such, it is undesirable to use titanium alloys in combination with HF acidizing compositions.

BRIEF DESCRIPTION OF THE DRAWINGS

The accompanying drawings, which are included to provide a further understanding of the disclosure and are incorporated in and constitute a part of this specification, illustrate preferred embodiments of the disclosure and together with the detailed description serve to explain the principles of the disclosure. In the drawings.

DETAILED DESCRIPTION OF THE PREFERRED EMBODIMENTS

Figure 1:
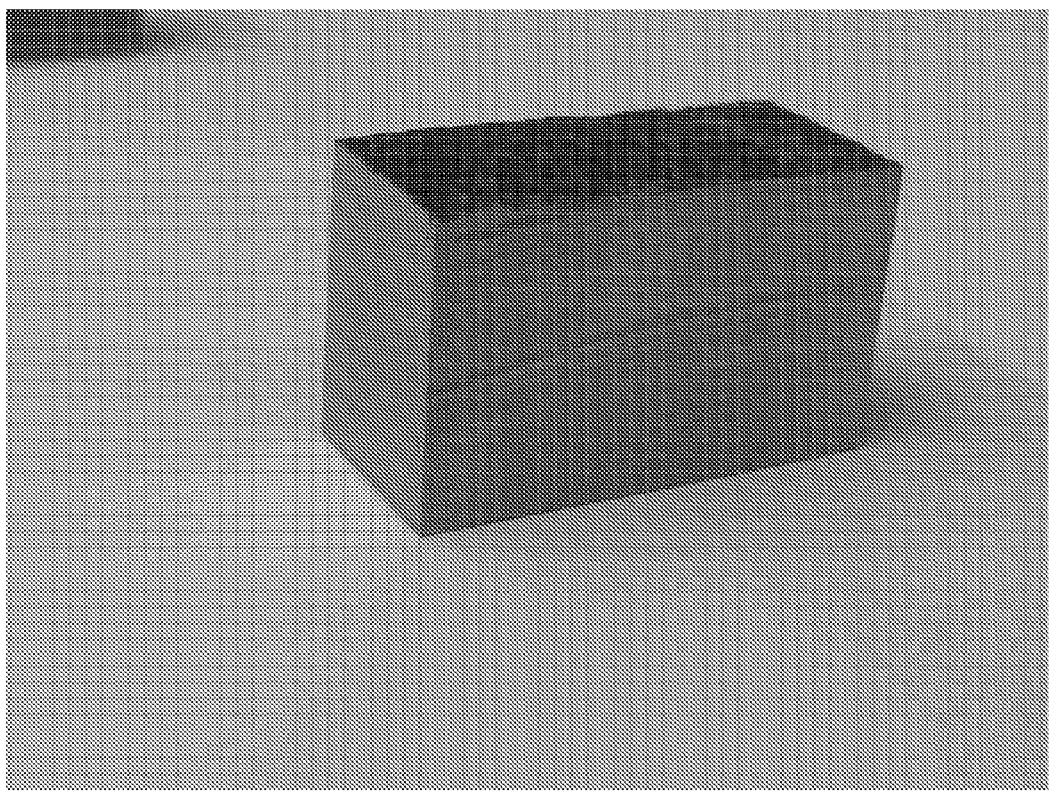
FIG. 1 is an image of an initial titanium alloy sample coupon.

Systems and methods are described for hydrofluoric acid (HF) acidizing compositions. In particular, to systems and methods for acidizing with sensitive metallurgic grades. The examples described herein relate to HF based compositions used with titanium alloys for illustrative purposes only. It is understood that the description herein can refer to any suitable acidizing compositions and use with any metallurgic grades. In particular, the systems and methods may be used wherever corrosion reduction is desirable. Embodiments may be utilized to provide corrosion resistance for any fluid used in oil well operations, e.g., acidizing fluids, fracturing fluids, drilling fluid, spacer fluid/flush, treatment fluids, settable fluids, production fluids, etc. However, embodiments described herein are particularly useful in the context of reducing corrosion resistance for sensitive metallurgic grades such as titanium alloys and used during acidizing operations.

Embodiments herein may include methods of use and compositions for an hydrofluoric acid (HF) acidizing treatment fluid that can be used in subterranean formations having metallurgical elements including titanium alloys.

Certain embodiments may include an acidic chelant-based hydrofluoric acid (HF) system used for acidizing stimulation treatments that can be effectively inhibited, with the aid of a corrosion inhibitor. In other embodiments, the fluid may also act to passivate the surface of titanium alloys against HF attack of said metal.

Exemplary compositions may include: (1) one or more acid solutions, (2) HF solution, and (3) one or more corrosion inhibitors.

Acid Solutions

The one or more acid solutions may be any acid solution. In certain embodiments, the acid solution is not HF or HCl. In preferred embodiments, the one or more acid solutions are methylglycine diacetic acid ("MGDA"). MGDA may be commercially available from BASF under the trade name TRILON M. In certain embodiments, the one or more acid solutions are glutamic acid diacetic acid ("GLDA") or its sodium, potassium, ammonium salts, such chelant is commercially available from Akzo Nobel. Alternatively iminodisuccinic acid ("IDS") (sodium salts of N-(1,2-dicarboxyethyl)-D,L-aspartic acid) may be used, which is commercially available from Lanxess as BAYPURE CX100.

Other acidic components to the acidizing treatment fluids may include (2-hydroxyethyl)ethylenediaminetriacetic acid ("HEDTA"), β-alanine diacetic acid ("β-ADA"), ethylenediaminedisuccinic acid, S,S-ethylenediaminedisuccinic acid ("EDDS"), iminodisuccinic acid ("IDS"), hydroxyiminodisuccinic acid ("HIDS"), polyamino disuccinic acids, N-bis[2-(1,2-dicarboxyethoxy)ethyl]glycine ("BCA6"), N-bis[2-(1,2-dicarboxyethoxy)ethyl]aspartic acid ("BCAS"), N-bis[2-(1,2-dicarboxyethoxy)ethyl]methylglycine ("MCBA5"), N-tris[(1,2-dicarboxyethoxy)ethyl]amine ("TCA6"), N-methylaminodiacetic acid ("MIDA"), iminodiacetic acid ("IDA"), N-(2-acetamido)iminodiacetic acid ("ADA"), hydroxymethyl-iminodiacetic acid, 2-(2-carboxyethylamino)succinic acid ("CEAA"), 2-(2-carboxymethylamino)succinic acid ("CMAA"), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N,N-diacetic acid, aspartic acid-N-monoacetic acid, including any salt, derivative, or combination thereof.

The one or more acid solution concentration and amounts may vary in the acidizing composition.

In certain embodiments of acidizing compositions utilizing MGDA, the amount of MGDA-Na3 may vary between approximately 1% to approximately 30% by weight of the treatment fluid.

When used as MGDA-Na3 (40% w/v), the amount may vary between approximately 1% to approximately 35%, more preferably between approximately 5% to approximately 30% (pH approximately 0.5 to approximately 4.5), and most preferably between approximately 8% to approximately 26% (pH approximately 1.5 to approximately 4).

When used as MGDA-Na3 particulate, the amount may vary between approximately 1% to approximately 50%, more preferably between approximately 5% to approximately 40 (pH approximately 0.5 to approximately 4.5), and most preferably between approximately 8% to approximately 26% (pH approximately 1.5 to approximately 4).

In certain embodiments of acidizing compositions utilizing GLDA, the amount of GLDA, such as GLDA-NaH3/GLDA-Na2H2/GLDA-Na3H/GLDA-Na4, may vary between approximately 1% to approximately 30%. In certain embodiments, preferred concentration ranges for GLDA-Nax (x=1, 2, 3, 4) (pH approximately 0.5 to approximately 4.5) may vary between approximately 5% to approximately 25%, more preferably between approximately 6% to approximately 20% (pH approximately 1.5 to approximately 4).

Hydrofluoric Acid

The hydrofluoric acid concentration and amounts may vary in the acidizing composition.

In certain embodiments of acidizing compositions, the HF concentration may vary between approximately 0.1% to approximately 4% by weight of the treatment fluid, more preferably between approximately 0.5% to approximately 2.5%, and most preferably between approximately 0.8% and approximately 1.9%.

In some embodiments, the hydrofluoric acid can be substituted by or combined with a mineral acid such as, for example, hydrochloric acid. In some embodiments, the hydrofluoric acid can be substituted by or combined with a hydrofluoric acid generating compound. In some embodiments, the hydrofluoric acid in a treatment fluid of the present invention may be produced from a suitable hydrofluoric acid generating compound. Examples of suitable hydrofluoric acid generating compounds include, but are not limited to, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetic acid complex, boron trifluoride phosphoric acid complex, boron trifluoride dihydrate, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

Corrosion Inhibitors

The concentration and amounts of the one or more corrosion inhibitors may vary in the acidizing composition.

In certain embodiments, the corrosion inhibitor may include sulfur-containing organic acids and/or amines, such as MSA-III (available from Halliburton Energy Services, Inc., Duncan, Okla.). Exemplary corrosion inhibitors for the acidic treatment fluid may at least one of the following: an acetylenic alcohol; a Mannich condensation product; an unsaturated carbonyl compound; an unsaturated ether compound; formamide; a formate; an iodide; a terpene; an aromatic hydrocarbon; cinnamaldehyde; a cinnamaldehyde derivative; an acetylenic alcohol; a fluorinated surfactant; a quaternary derivative of heterocyclic nitrogen base; a quaternary derivative of a halomethylated aromatic compound; and combinations thereof. In certain embodiments, a concentration of corrosion inhibitor may be approximately 0.1% to approximately 5%. Ranges of amounts of corrosion inhibitor may vary and be dependent on the specific inhibitor type. For example, an exemplary amount of MSA-III may require a concentration of approximately 0.5% to approximately 1%, but higher concentrations could be used.

In certain embodiments, no corrosion inhibitor activator or intensifier may be used.

Compositions and Uses

Embodiments described herein may be particularly useful with sensitive metallurgic grades that are typically incompatible with existing HF acidizing treatments. For example, it may be considered impossible to utilize titanium alloys in combination with existing HF acidizing treatments as such will destroy and/or corrode the metal. Using a composition including, for example, 0.6 M MGDA concentration in conjunction with HF, may unexpectedly mitigate or prevent corrosion of a titanium alloy.

Certain embodiments may not be HCl-based as in standard HF treatments. In certain embodiments, the compositions may not have an extremely low pH like most HCl/HF fluids require. Certain embodiments may not need any corrosion inhibitor intensifier, and may only require corrosion inhibitor concentrations that are typical in common acidizing treatments.

In certain embodiments, the fluid, whose properties may include a pH>1 and a combination of HF with high concentration of chelant, such as MGDA or GLDA, may be used to stimulate formations such as geothermal wells where any other HF-containing fluid might be inappropriate. The treatment of geothermal reservoirs is a challenging task, due to the difficulty of removing silica and silicate mineral deposits that typically require a HF-containing fluid to dissolve the latter. Embodiments described herein may allow HF-containing fluids to be used on wells containing titanium alloys, such as geothermals, which has been previously unfeasible. Embodiments described herein may also be used for wells bottomhole static temperature in excess of approximately 300° F. Since the described fluid appears to have less corrosion than typical HF treatments, the applicable temperature range can be extended thus multiplying potential uses, opportunities, and revenues.

Embodiments herein may provide a fluid that ameliorates the use of highly corrosive acidic fluids that otherwise contain, by necessity, corrosion inhibition packages. Certain embodiment may expand the available area of acidizing high temperature sandstones.

Blends with concentrations of methylglycine diacetic acid ("MGDA") ranging from approximately 0.6 M (approximately 12% w/v of the free acid form of the chelant) and HF ranging from approximately 1.5% to approximately 3%, using varying amounts of a corrosion inhibitor, such as MSA-III corrosion inhibitor (MSA-III™ 2.0% (w/v) available from Halliburton Energy Services, Inc., Duncan, Okla.) may prevent or inhibit corrosion. In certain embodiments, the composition of a fluid that passes corrosion requirements up to 300° F. may include: approximately 12% to approximately 16% MGDA, approximately 1.5% HF, and approximately 1% MSA-III at pH 2. In certain embodiments, mixing may be performed on the surface, before pumping the fluid treatment blend into a wellbore. Any specific mixing order may be used. In certain embodiments mixing order may include MGDA, HCl, ammonium bifluoride ("ABF"), surfactant, and corrosion inhibitor.

The treatment fluids of the present invention generally include an aqueous base fluid and at least one acid component. In illustrative embodiments, suitable acid components can comprise GLDA, any GLDA salt, or any GLDA derivative, or hydroxyl iminodisuccinic acid ("HIDS"), or iminodisuccinic acid ("IDS"). In other embodiments, suitable acid components including MGDA, any salt thereof, any derivative thereof, or any combination thereof, including combinations with GLDA, can be used in the treatment fluids. Likewise, any of the previously listed biodegradable chelating agents can also be used in conjunction with the present invention, such as HIDS or IDS.

Optionally, salts, other pH additives, corrosion inhibitors, surface active agents, anti-sludging agents, mutual solvents, scale inhibitors, viscosifiers, gases, diverting/fluid loss agents, and the like may be included in the treatment fluids of the present invention. The present treatment fluids can be used in subterranean formations to prevent or remediate precipitation damage in the formation caused by the dissolution of formation cations, particularly in the presence of hydrofluoric acid. Likewise, the present treatment fluids can be used in treating pipes, tubing, and like vessels.

Generally, the base fluid of the present invention may comprise any aqueous fluid. In particular embodiments, the base fluid may comprise fresh water, salt water (e.g., water containing one or more salts dissolved therein), brine (e.g., saturated salt water), sea water, any combination thereof, or any derivative thereof. In other embodiments, the base fluid may comprise a liquid chelating agent or scale control agent by itself. Generally, the base fluid may be from any source, provided that it does not contain components that might adversely affect the stability and/or performance of the treatment fluids of the present invention.

The treatment fluids of the present invention may also include one or more well-known additives, such as components to modify the rheological properties (e.g., viscosity) of the treatment fluids, gel stabilizers, fluid loss control additives, particulates, acids, corrosion inhibitors, catalysts, clay stabilizers, biocides, friction reducers, surfactants, solubilizers, pH adjusting agents, bridging agents, dispersants, flocculants, foamers, gases, defoamers, $H_2S$ scavengers, $CO_2$ scavengers, oxygen scavengers, scale inhibitors, lubricants, viscosifiers, weighting agents, and the like. One of ordinary skill in the art, with the benefit of this disclosure, will be able to determine the appropriate type and amount of such additives for a particular application. For example, in some embodiments, it may be desired to foam a treatment fluid of the present invention using a gas, such as air, nitrogen, or carbon dioxide.

In some embodiments, methods described herein comprise providing a treatment fluid that comprises an aqueous base fluid, an acid component, a hydrofluoric acid or a hydrofluoric acid generating compound, and a corrosion inhibitor, and introducing the treatment fluid into at least a portion of a subterranean formation. The treatment fluid may remove potentially damaging precipitates from the formation, for example.

To facilitate a better understanding of the present invention, the following examples of preferred embodiments are given. In no way should the following examples be read to limit, or to define, the scope of the invention.

EXAMPLES

Example 1

Coupon specimens made of titanium alloy were cleaned, weighed, and immersed in 100 mL of the treatment fluids including water and an acidizing compositions (indicated for each sample in Table 1). Ti alloy was a commercial grade material employed in typical surface casing completions. The titanium alloy was a Ti 6Al-4V alloy. The coupon specimens immersed in treatment fluid were pressurized to 1000 psi and then heated to the test temperature indicated in Table 1 below for the contact time indicated. After the contact time elapsed, any residues were cleaned from the specimens and the coupons were weighed again to determine the amount of corrosion loss by subtracting the final weight of the specimen from its initial weight before the test. The results are reported in Table 1 below.

TABLE 1

| 0.6M MGDA-Na3, 0.1% alkylphenol-formaldehyde resin, pH 2.0 | | | | |
|---|---|---|---|---|
| Temperature (° F.) | Alloy | Duration (h) | MSA-III (w/v) | Corrosion Loss (lb/ft$^2$) |
| 375 | Ti | 6 | 0.8 | 0.022 |
| 375 | Ti | 12 | 0.6% | 0.015 |

| MGDA-Na3, 3% Cla-Web (non-ionic surfactant commercially available from WellChem Technologies, an Ecolab Company), 1.7% HF, pH 1.9 | | | | |
|---|---|---|---|---|
| Temperature (° F.) | Alloy | Duration (h) | Additives (w/v) | Corrosion Loss (lb/ft$^2$) |
| 375 | Ti | 6 | 0.6% MSA-III | 0.757 |
| 375 | Ti | 6 | 0.6 MSA-III | DID NOT PASS; NOT WEIGHABLE |
| 375 | Ti | 6 | 1.8% MSA-III | DID NOT PASS; NOT WEIGHABLE |

| 16% MGDA-Na3, 1.5% HF, 1% MSA-III, pH 2 | | | |
|---|---|---|---|
| Temperature (° F.) | Alloy | Duration (h) | Corrosion Loss (lb/ft$^2$) |
| 300 | Ti* | 3 | 0.02 |
| 200 | Ti | 6 | No weight loss detected |

*Reused coupon, previously acidized at 200° F. for 6 h

Example 2

Sequential testing was performed on one or more coupon specimens. A coupon specimen made of titanium alloy was cleaned, weighed, and immersed in 100 mL of the treatment fluids including water and an acidizing compositions (indicated in Table 2). The coupon specimen immersed in treatment fluid was pressurized to 1000 psi and then heated to the test temperature indicated in Table 2 below for the contact time indicated. After the contact time elapsed, any residues were cleaned from the specimens and the coupons were weighed again to determine the amount of corrosion loss by subtracting the final weight of the specimen from its initial weight before the test. The results are reported in Table 2 below as well as FIGS. 1-5.

FIG. 1 is an image of an initial titanium alloy sample coupon.

Figure 2:
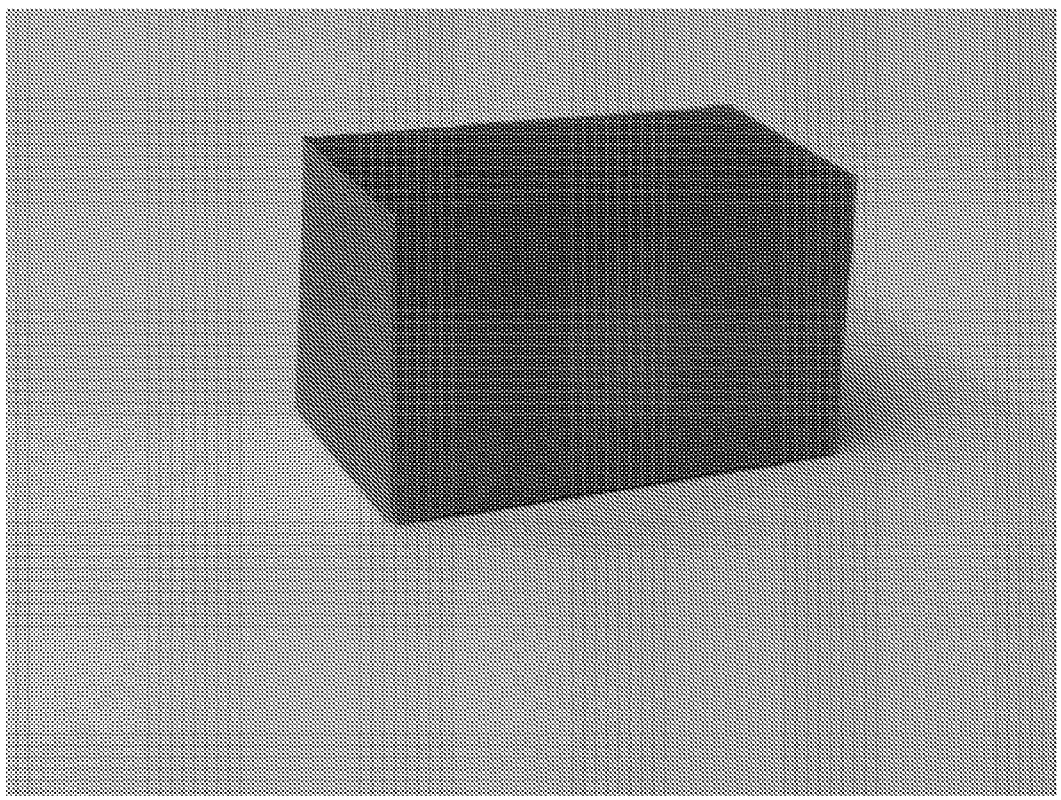
FIG. 2 is an image of a titanium alloy sample coupon after treatment with 16% FDP-S1028-11, pH 2.

FIG. 2 is an image of a titanium alloy sample coupon after treatment with 16% MGDA-Na3, pH 2.

Figure 3:
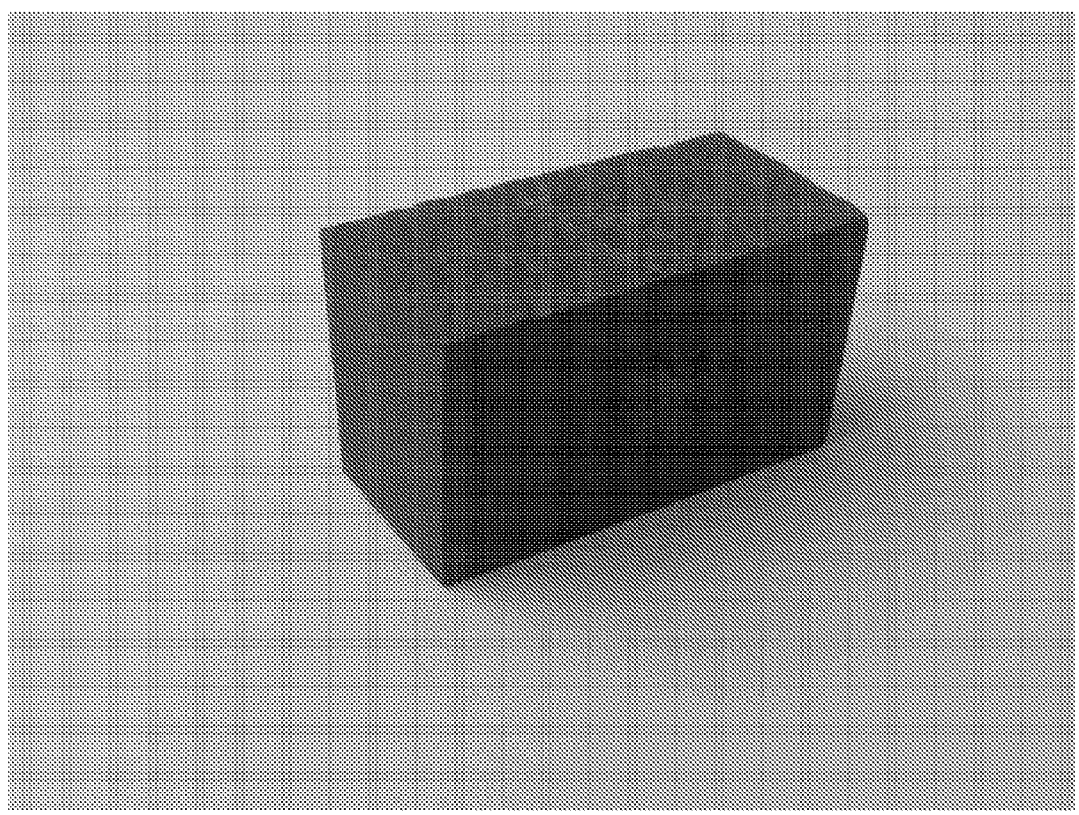
FIG. 3 is an image of a titanium alloy sample coupon after treatment with 16% MGDA-Na3, 1.5% HF, 1% MSA-III, pH 2.

FIG. 3 is an image of a titanium alloy sample coupon after treatment with 16% MGDA-Na3, 1.5% HF, 1% MSA-III, pH 2.

Figure 4:
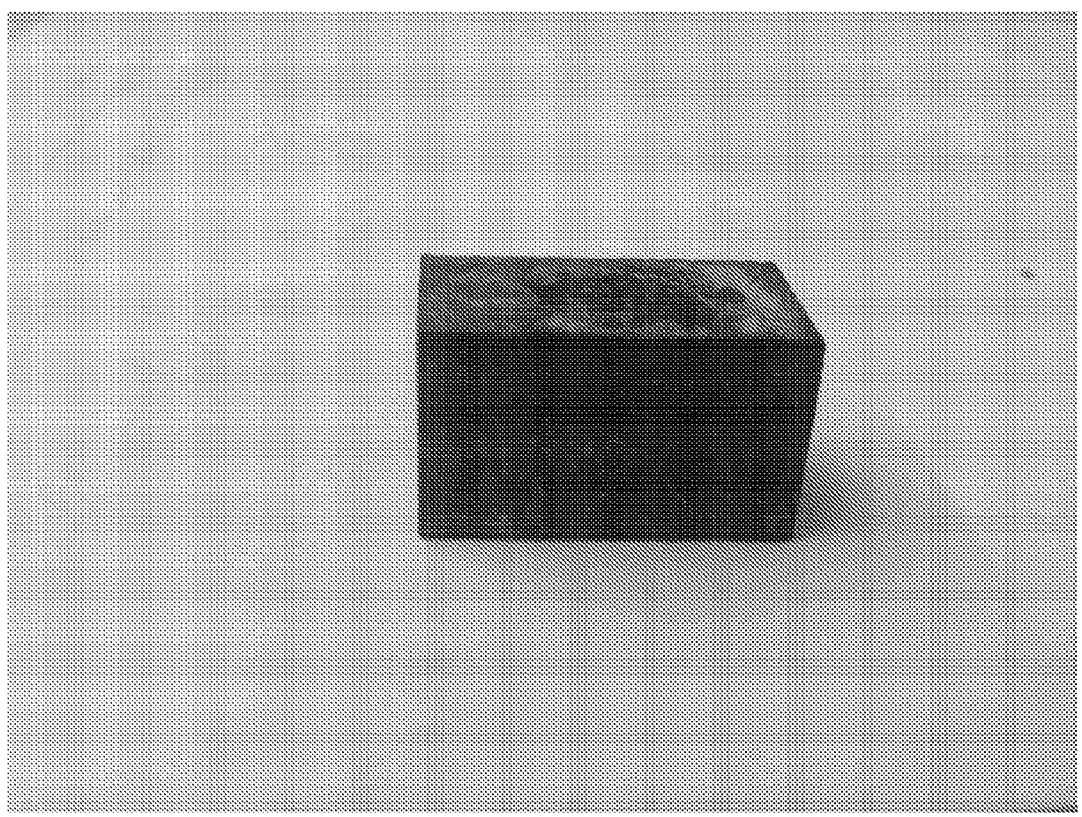
FIG. 4 is an image of a titanium alloy sample coupon after treatment with uninhibited 16% MGDA-Na3, 1.5% HF, pH 2 and then with 16% MGDA-Na3, 1.5% HF, 1% MSA-III, pH 2.

FIG. 4 is an image of a titanium alloy sample coupon after treatment of uninhibited 16% MGDA-Na3, 1.5% HF, pH 2 and then 16% MGDA-Na3 1.5% HF, 1% MSA-III, pH 2.

Figure 5:
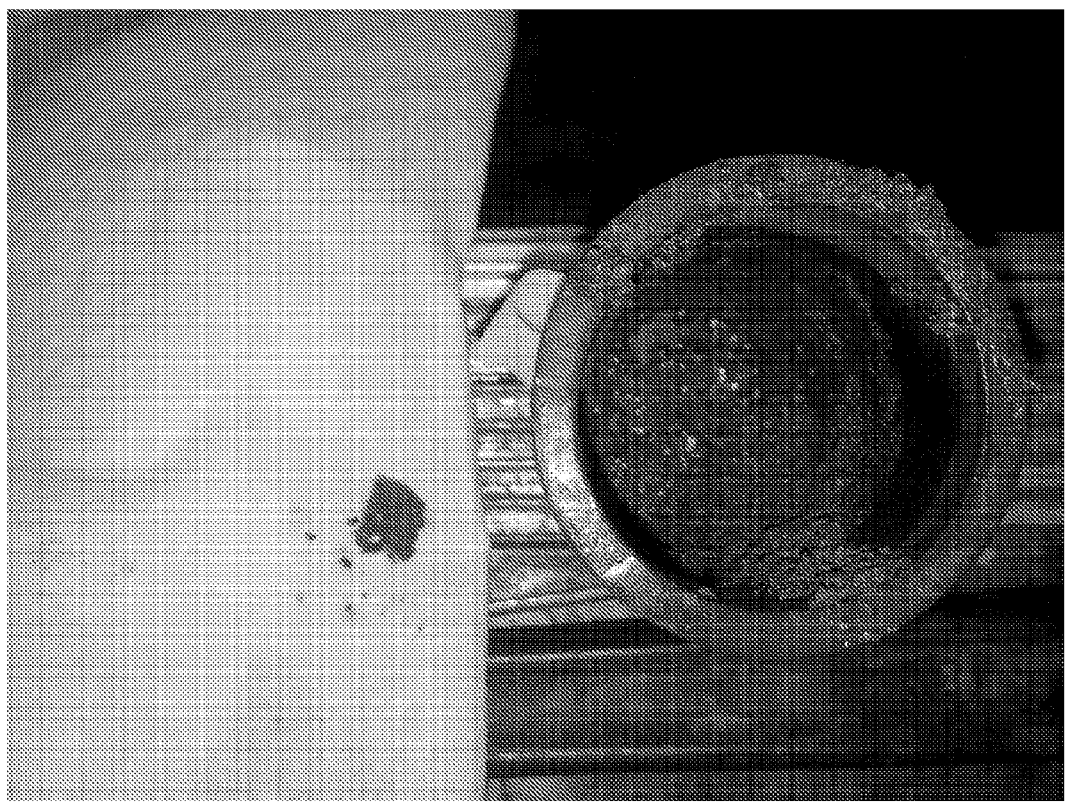
FIG. 5 is an image of a titanium alloy sample coupon after treatment with 0.6% MGDA-Na3, 1.7% HF, 3% Cla-Web 0.6%, MSA-III, pH 1.9.

FIG. 5 is an image of the remains of a titanium alloy sample coupon after treatment with 0.6% MGDA-Na3, 1.7% HF, 3% Cla-Web 0.6%, MSA-III pH 1.9. In general, fluids that managed corrosion were 16% (0.6 M), while the fluid in FIG. 5 is only 0.6% (~0.01 M).

TABLE 2

| 16% MGDA-Na3, pH 2 | | | | | |
|---|---|---|---|---|---|
| Temperature (° F.) | Alloy | Duration (h) | HF (w/v) | Inhibitor (w/v) | Corrosion Loss (lb/ft$^2$) |
| 300 | Ti | 6 | 0 | 0 | 0.003 |
| 200 | Ti | 6 | 1.50% | 1% MSA-III | No weight loss detected |
| 200 | Ti | 6 | 1.50% | 0 | 0.163 |
| 300 | Ti | 3 | 1.50% | 1% MSA-III | 0.02 |

Example 3

Figure 6:
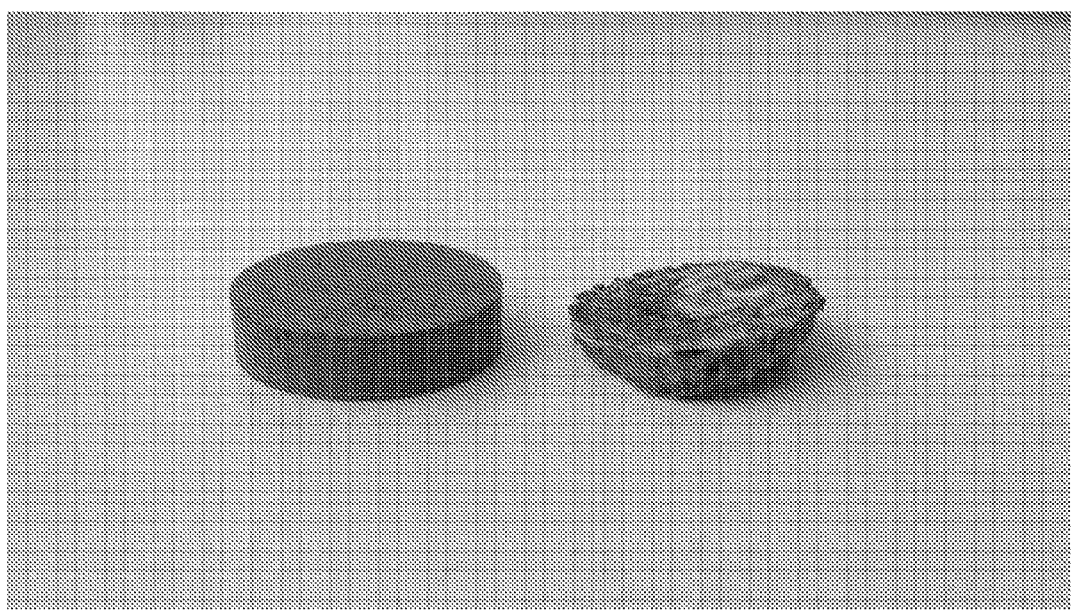
FIG. 6 is an image of titanium sample coupons after treatment with 0.6M MGDA-Na3, 1.6% ABF, 3% Cla-Web, pH 3.5 (left) and 13.5% HCl, 1.5% HF (right), both at 300° F. for 4 hrs.

Coupon specimens made of titanium alloy were cleaned, weighed, and immersed in 100 mL of the treatment fluids including water and an acidizing compositions. Ti alloy was a commercial grade material employed in typical surface casing completions. The titanium alloy was a Ti 6Al-4V alloy. The coupon specimens immersed in treatment fluid were pressurized to 1000 psi and then heated to the test temperature indicated for a set contact time. After the contact time elapsed, any residues were cleaned from the specimens and the coupons were weighed again to determine the amount of corrosion loss by subtracting the final weight of the specimen from its initial weight before the test. FIG. 6 is an image of titanium sample coupons after treatment with MGDA-Na3: 0.6M MGDA-Na3, 1.6% ABF, 3% Cla-Web, pH 3.5 (left) and 13.5% HCl, 1.5% HF (right), both at 300° F. for 4 hrs.

Example 4

Testing was performed using a commercially obtained material (Coupon #) and an actual sample from a turbine employed in a well (Specimen), which was a typical casing tubing metallurgy similar to the commercially obtained material with other characteristics specific to a high temperature well. Tables 3 and 4 describe results of the testing.

TABLE 3

| Corrosion Mass Loss of Commercial Titanium | | | | | | | | | | |
|---|---|---|---|---|---|---|---|---|---|---|
| Metallurgy (Titanium) | Temp (° F.) | Duration (hours) | MGDA-Na3 | [HF] | pH | HAI-OS* | MSA-III | HII-124B** | Cla-Web | Corrosion Loss (lbs/ft$^2$) |
| Coupon 1 | 300 | 4 | 0.6M | 1.10% | 3.5 | 4% | | 40# | 3% | 0.007 |
| Coupon 2 | 300 | 4 | 0.3M | 1.10% | 4 | | 1% | | | 0.019 |
| Coupon 3 | 300 | 4 | 0.6M | 0.84% | 3.6 | | 1% | | | 0.001 |
| Coupon 4 | 300 | 4 | 0.5M | 1.96% | 3.1 | | 1% | | | 0.042 |
| Coupon 5 | 250 | 4 | 0.6M | 1.10% | 2.5 | 4% | | | | 0.007 |
| Coupon 6 | 300 | 4 | 0 | 1.5% | 13.5% HCl | 4% | | 40# | | 0.57 |

*HAI-OS is an acetylenic-based corrosion inhibitor.
**HII-124B is an inorganic salt intensifier.

TABLE 4

Corrosion Mass Loss of Titanium Casing

| Metallurgy (Titanium) | Temp (° F.) | Duration (hours) | MGDA-Na3 | [HF] | pH | MSA-III | alkylphenol-formaldehyde resin | HII-124B | Cla-Web | Corrosion Loss (lbs/ft$^2$) |
|---|---|---|---|---|---|---|---|---|---|---|
| Specimen 1 | 375 | 6 | 0.6M (16%) | | 2 | 0.20% | 0.10% | | 0.022 | 0.022 |
| Specimen 2 | 375 | 12 | 0.6M (16%) | | 2 | 0.80% | 0.10% | | 0.015 | 0.015 |
| Specimen 3 | 375 | 6 | 0.01M (0.6%) | 1.70% | 1.9 | 0.60% | | 3% | 0.757 | 0.757 |
| Specimen 4 | 375 | 6 | 0.01M (0.6%) | 1.70% | 1.9 | 0.60% | | 3% | | unweighable |
| Specimen 5 | 375 | 6 | 0.01M (0.6%) | 1.70% | 1.9 | 1.80% | | 3% | | unweighable |
| Specimen 6 | 300 | 3 | 0.6M (16%) | 1.50% | 2 | 1% | | | 0.02 | 0.02 |
| Specimen 7 | 200 | 6 | 0.6M (16%) | 1.50% | 2 | 1% | | | | 0 |
| Specimen 8 | 250 | 6 | 0.6M (16%) | 1.12% HF | 2.5 | 2.5% | | | | 0.015 |
| Specimen 9 | 300 | 6 | 0.3M (8%) | 1.96% HF | 3 | 2.5% | | | | 0.013 |
| Specimen 10 | 300 | 6 | 0.3M (8%) | 1.96% HF | 3 | 2.5% | | | | 0.012 |

The exemplary acidizing compositions disclosed herein may directly or indirectly affect one or more components or pieces of equipment associated with the preparation, delivery, recapture, recycling, reuse, and/or disposal of the disclosed acidizing compositions. For example, the disclosed acidizing compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary acidizing compositions. The disclosed acidizing compositions may also directly or indirectly affect any transport or delivery equipment used to convey the acidizing compositions to a well site or downhole such as, for example, any transport vessels, conduits, pipelines, trucks, tubulars, and/or pipes used to compositionally move the acidizing compositions from one location to another, any pumps, compressors, or motors (e.g., topside or downhole) used to drive the acidizing compositions into motion, any valves or related joints used to regulate the pressure or flow rate of the acidizing compositions, and any sensors (i.e., pressure and temperature), gauges, and/or combinations thereof, and the like. The disclosed acidizing compositions may also directly or indirectly affect the various downhole equipment and tools that may come into contact with the acidizing compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

Although the foregoing description is directed to the preferred embodiments of the disclosure, it is noted that other variations and modifications will be apparent to those skilled in the art, and may be made without departing from the spirit or scope of the disclosure. Moreover, features described in connection with one embodiment of the disclosure may be used in conjunction with other embodiments, even if not explicitly stated above.

What is claimed is:

1. A method of treating a subterranean formation, the method comprising:
    preparing an aqueous acidizing composition comprising one or more acid components, hydrofluoric acid, and one or more corrosion inhibitors; and
    injecting the aqueous composition into a subterranean formation containing a titanium alloy via a wellbore.

2. The method of claim 1, wherein one or more acid components are methylglycine diacetic acid.

3. The method of claim 2, wherein the one or more acid components is present from approximately 1% to approximately 30% by weight of the acidizing composition.

4. The method of claim 1, wherein the one or more acid components are glutamic acid diacetic acid, hydroxyl iminodisuccinic acid, or iminodissucinic acid.

5. The method of claim 4, wherein the one or more acid components is present from approximately 1% to approximately 30% by weight of the acidizing composition.

6. The method of claim 1, wherein the one or more acid components are a mixture of two or more of: methylglycine diacetic acid, glutamic acid diacetic acid, hydroxyl iminodisuccinic acid, and iminodisuccinic acid.

7. The method of claim 1, wherein the hydrofluoric acid is present from approximately 0.4% to approximately 4% by weight of the acidizing composition.

8. The method of claim 1, wherein the one or more corrosion inhibitors are selected from the group consisting of: an acetylenic alcohol; a Mannich condensation product; an unsaturated carbonyl compound; an unsaturated ether compound; formamide; a formate; a carbonyl; a terpene; an aromatic hydrocarbon; cinnamaldehyde; a cinnamaldehyde derivative; an acetylenic alcohol; a fluorinated surfactant; a quaternary derivative of heterocyclic nitrogen base; a quaternary derivative of a halomethylated aromatic compound; and combinations thereof.

9. The method of claim 1, wherein the wellbore is a geothermal well or a well with bottomhole static temperature in excess of approximately 300° F.

10. A composition of treating a subterranean formation, the composition comprising:
an aqueous chelant;
one or more acid components;
hydrofluoric acid; and
one or more corrosion inhibitors, and
wherein the aqueous composition is adapted for injecting into a subterranean formation containing a titanium alloy via a wellbore.

11. The composition of claim 10, wherein one or more acid components are methylglycine diacetic acid.

12. The composition of claim 11, wherein the one or more acid components is present from approximately 1% to approximately 30% by weight of the acidizing composition.

13. The composition of claim 10, wherein the one or more acid components are glutamic acid diacetic acid, hydroxyl iminodisuccinic acid, or iminodissucinic acid.

14. The composition of claim 13, wherein the one or more acid components is present from approximately 1% to approximately 30% by weight of the acidizing composition.

15. The composition of claim 10, wherein the one or more acid components are a mixture of two or more of: methylglycine diacetic acid, glutamic acid diacetic acid, hydroxyl iminodisuccinic acid, and iminodisuccinic acid.

16. The composition of claim 10, wherein the hydrofluoric acid is present from approximately 0.4% to approximately 4% by weight of the acidizing composition.

17. The composition of claim 10, wherein the one or more corrosion inhibitors are selected from the group consisting of: an acetylenic alcohol; a Mannich condensation product; an unsaturated carbonyl compound; an unsaturated ether compound; formamide; a formate; a carbonyl; a terpene; an aromatic hydrocarbon; cinnamaldehyde; a cinnamaldehyde derivative; an acetylenic alcohol; a fluorinated surfactant; a quaternary derivative ofheterocyclic nitrogen base; a quaternary derivative of a halomethylated aromatic compound; and combinations thereof.

18. The composition of claim 10, wherein the wellbore is a geothermal well or a well with bottomhole static temperature in excess of approximately 300° F.

* * * * *